H. G. CHATAIN AND H. W. STOCK.
MEANS FOR PREVENTING VIBRATION OF RECIPROCATING ENGINES.
APPLICATION FILED MAY 27, 1918.

1,306,522.

Patented June 10, 1919.

Inventors:
Henri G. Chatain,
Henry W. Stock,
by
Their Attorney.

UNITED STATES PATENT OFFICE.

HENRI G. CHATAIN AND HENRY W. STOCK, OF ERIE, PENNSYLVANIA, ASSIGNORS TO GENERAL ELECTRIC COMPANY, A CORPORATION OF NEW YORK.

MEANS FOR PREVENTING VIBRATION OF RECIPROCATING ENGINES.

1,306,522.  Specification of Letters Patent.  Patented June 10, 1919.

Application filed May 27, 1918. Serial No. 236,887.

*To all whom it may concern:*

Be it known that we, HENRI G. CHATAIN and HENRY W. STOCK, citizens of the United States, residing at Erie, in the county of Erie, State of Pennsylvania, have invented certain new and useful Improvements in Means for Preventing Vibration of Reciprocating Engines, of which the following is a specification.

The present invention relates to reciprocating engines and has for its object to provide an improved arrangement for preventing vibration of such engines.

For a consideration of what we believe to be novel and our invention, attention is directed to the accompanying specification and the claims appended thereto.

Figure 1:
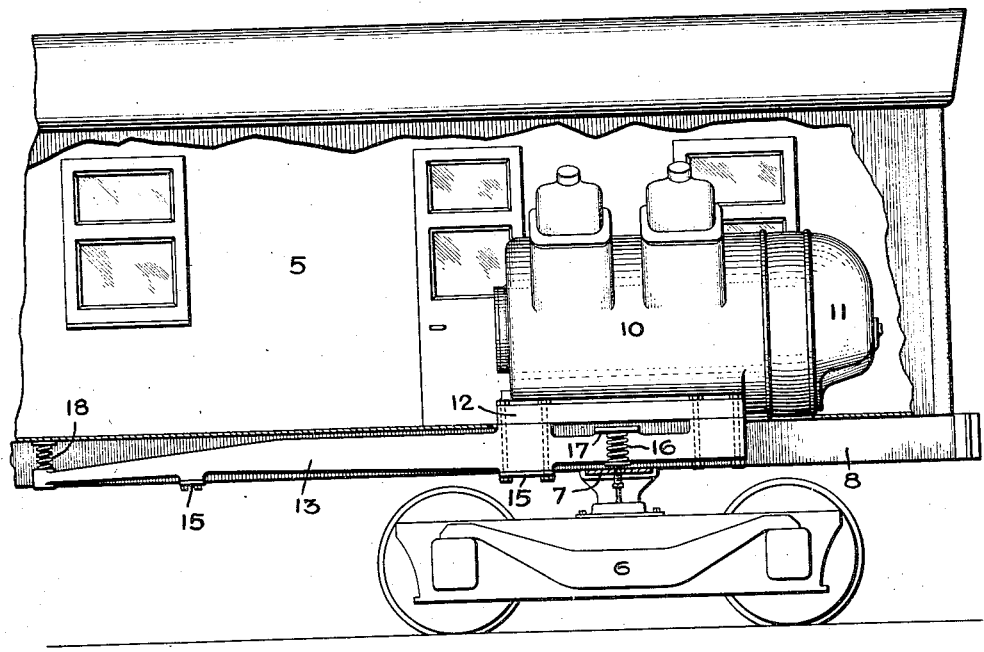
Figure 2:
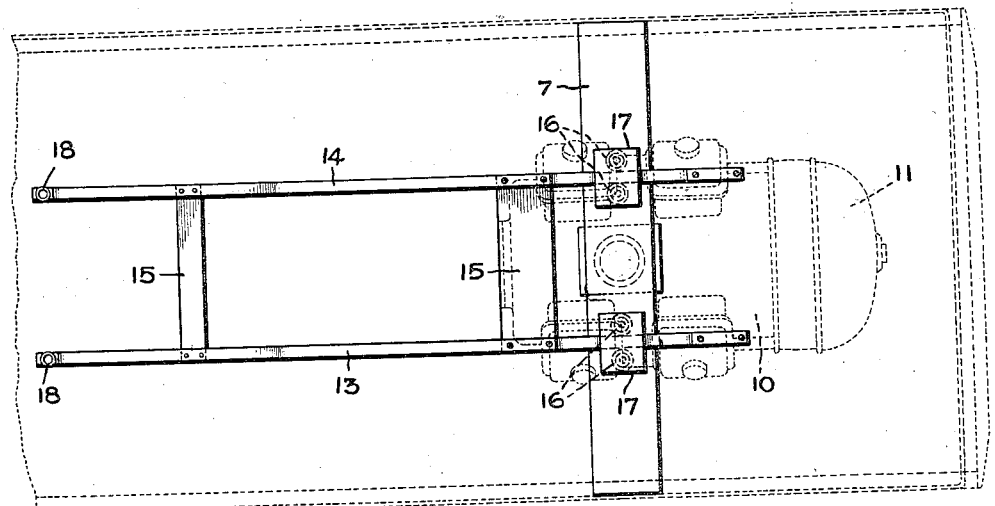
Figure 3:
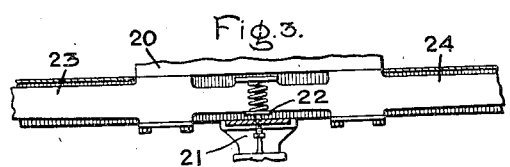

In the drawing, Figure 1 is a side elevation of an engine embodying our invention; Fig. 2 is a top plan view of the support, and Fig. 3 is a view of a modification.

In the present instance, our invention is shown as applied to an internal combustion engine mounted in a car, the engine being direct connected to a generator which supplies current to motors on the car axles. This is an important application of our invention for in such cars it is very desirable that an engine vibrate as little as possible and also that such vibrations as do occur be prevented from being transmitted to the car body. It will be understood, however, that this is only one application of our invention and that it may be utilized wherever found desirable.

Referring to the drawing, 5 indicates a car body, 6 a truck for supporting one end of it, and 7 a bolster upon which the sills 8 of the car body directly rest. 10 indicates a reciprocating engine, here shown as an internal combustion engine, direct connected to a generator 11.

Now according to our invention the engine is supported on resilient means such as springs which extend transversely of the engine base intermediate between its ends and as near to the center of mass of the engine as is found practicable, and the base of the engine is provided with a long tail piece which extends either forward or backward from the base and which at its free end is attached to a fixed support by suitable spring means. Or, in some instances, the engine base is provided with a tail piece extending both forward and backward of it.

By this means we have found that we can greatly decrease or in some cases practically eliminate certain vibrations and put the engine in stable equilibrium. One of the principal reasons of this is that the tail piece or tail pieces increases or increase greatly the moment of inertia of the engine and thus decreases the amplitude of any vibrations which occur. The moment of inertia is proportional to the squares of the distances of the elementary parts from the axis and as a result a long tail piece, while it does not add greatly to the mass does greatly increase the moment of inertia of the mass subject to vibration and of course the greater the moment of inertia the less the mass will move.

In the particular embodiment of our invention illustrated in Figs. 1 and 2, the engine base 12 is bolted at its four corners to one end of a frame made up of two side bars 13 and 14 fastened in spaced relations to each other by cross pieces 15, and bars 13 and 14 are in turn supported by coiled springs 16 which are located between plates 17 on the bars 13 and 14 and the bolster 7. Springs 16 are arranged in a row transversely of the engine base and are located midway between its two ends. The ends of the side bars 13 and 14 remote from the engine base form the tail piece referred to above and they are attached to the car body 5, by springs 18 which are comparatively light.

The center of mass of the engine-generator structure as a whole, it will be noted, is shown in this instance as being to one side of the support formed by springs 16, and the long tail piece formed by side bars 13 and 14 projects from the other side and is of such extent that it brings the center of mass toward and more nearly over the springs 16 and puts the engine in stable equilibrium. As a result, the vertical vibrations of the whole mass supported by springs 16 are to a great extent eliminated and such vibrations as do occur are taken up by springs 16 and are applied directly to the truck bolster. Such vertical vibration, therefore, will not have any tendency to set the car body 6 in vibration. The long tail piece when of the structure as shown also forms in substance two spaced lever arms 13 and 14 which engage the bottom of the car body and they will therefore resist any rocking couple of the engine mass, and as this couple is acting on the car body through such a long arm, the force applied to it is very small and has little or no effect in causing the car body to vibrate.

In Fig. 3 is indicated a modification in which the tail piece extends both forward and backward. 20 indicates the engine base, 21 the bolster, 22 the coiled spring support, and 23 and 24 tail pieces, one extending forward of the engine and the other backward of it. The operation of this modification will be clear from the explanation already given in connection with Figs. 1 and 2.

In accordance with the provisions of the patent statutes, we have described the principle of operation of our invention, together with the apparatus which we now consider to represent the best embodiment thereof; but we desire to have it understood that the apparatus shown is only illustrative and that the invention can be carried out by other means.

What we claim as new and desire to secure by Letters Patent of the United States, is:—

1. In combination, a support, a reciprocating engine resiliently mounted thereon, and a member connected to the engine base and projecting therefrom to increase the moment of inertia of the engine.

2. An engine having means projecting from its base to increase the moment of inertia of the engine, and resilient means for supporting the engine.

3. An engine having a frame work projecting from its base to increase the moment of inertia of the engine, and resilient means for supporting the engine.

4. In combination, a support, a reciprocating engine resiliently mounted thereon, a member connected to the engine base and projecting therefrom to increase the moment of inertia of the engine, a fixed support remote from the engine, and means resiliently connecting the projecting member to said fixed support.

5. In combination, a support, a reciprocating engine, resilient means on the support upon which the engine rests, said resilient means being located in a plane extending transversely of the engine, a long tail piece projecting from the engine base, and means for resiliently supporting the free ends of the tail piece.

6. In combination, a support, a reciprocating engine, resilient means on the support upon which the engine rests, said resilient means being located in a plane extending transversely of the engine, and a rectangular frame connected to the engine base and projecting outwardly therefrom at right angles to the transverse plane of the supports, said frame being yieldingly supported at its outer end.

In witness whereof, we have hereunto set our hands this 24th day of May, 1918.

HENRI G. CHATAIN.
HENRY W. STOCK.